(12) United States Patent
Kielczykowski et al.

(10) Patent No.: US 11,014,685 B2
(45) Date of Patent: May 25, 2021

(54) RELEASE MECHANISM

(71) Applicant: Hamilton Sundstrand Corporation, Charlotte, NC (US)

(72) Inventors: Przemyslaw Kielczykowski, Wroclaw (PL); Jakub Bobak, Legnica (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 224 days.

(21) Appl. No.: 16/117,032

(22) Filed: Aug. 30, 2018

(65) Prior Publication Data
US 2019/0092489 A1 Mar. 28, 2019

(30) Foreign Application Priority Data
Sep. 28, 2017 (EP) .................................... 17461615

(51) Int. Cl.
*G05G 5/06* (2006.01)
*B64D 41/00* (2006.01)
(Continued)

(52) U.S. Cl.
CPC ........... *B64D 41/00* (2013.01); *B64D 41/007* (2013.01); *E05B 47/00* (2013.01); *F16H 21/44* (2013.01); *G05G 5/06* (2013.01); *B64D 2041/002* (2013.01); *F05D 2220/34* (2013.01); *G05G 2505/00* (2013.01)

(58) Field of Classification Search
CPC ................. B64D 41/00; B64D 41/007; B64D 2041/002; B64D 45/00; E05B 47/00; E05B 2047/0015; E05B 2047/0016; E05B 2047/0018; E05B 2047/0024; E05B 2047/0035; E05B 2047/0037; E05B 2047/0002; E05B 2047/0003; E05B 2047/0004; E05B 77/02; F16H 21/44; F16H 21/06; F16H 21/02; F16H 21/04; G05G 5/06; G05G 5/08; G05G 2505/00; F05D 2220/34; E05C 19/12; B65D 45/02; B65D 45/025; B66F 7/0691; B66F 7/0608; B66F 7/065; B66F 7/28
USPC .... 74/2, 110, 101–106; 292/21, 23, 92, 113, 292/271, 585
See application file for complete search history.

(56) References Cited

U.S. PATENT DOCUMENTS 3,149,678 A * 9/1964 Chilman ............... F03D 7/0216
244/58
3,287,513 A * 11/1966 McFarland ............ H01H 13/50
200/16 C
(Continued)

FOREIGN PATENT DOCUMENTS

WO 8702642 A1 5/1987

OTHER PUBLICATIONS

Extended European Search Report for International Application No. 17461615.1 dated Nov. 28, 2017, 8 pages.

*Primary Examiner* — Jake Cook
*Assistant Examiner* — T. Scott Fix
(74) *Attorney, Agent, or Firm* — Cantor Colburn LLP (57) ABSTRACT

A toggle release mechanism comprises a platform, a toggle element comprising one or more rolling or sliding elements configured to move along a track between a first, locking position and a second, release position, and a solenoid configured to move the one or more rolling or sliding elements along the track between the first, locking position and the second, release position.

9 Claims, 5 Drawing Sheets

(51) Int. Cl.
*F16H 21/44* (2006.01)
*E05B 47/00* (2006.01)

(56) References Cited

U.S. PATENT DOCUMENTS

| | | | | |
|---|---|---|---|---|
| 3,501,120 | A * | 3/1970 | Daniel, Jr. | A47B 88/483 248/277.1 |
| 3,558,103 | A * | 1/1971 | Lodige | B66F 7/08 254/122 |
| 3,680,881 | A * | 8/1972 | Douglas | B60G 3/26 74/103 |
| 3,854,763 | A | 12/1974 | Zawadzki et al. | |
| 3,902,606 | A * | 9/1975 | Ronbeck | B21D 43/105 414/733 |
| 3,991,857 | A * | 11/1976 | Wolk | B66F 7/065 187/269 |
| 5,050,844 | A * | 9/1991 | Hawk | B66F 7/0633 254/89 H |
| 5,450,928 | A * | 9/1995 | Isogai | B66F 7/0691 187/205 |
| 5,613,636 | A * | 3/1997 | Zubillaga | F02K 1/008 239/265.35 |
| 5,979,606 | A * | 11/1999 | Wheeler | B65G 47/643 187/269 |
| 6,059,263 | A * | 5/2000 | Otema | B66F 7/0691 254/10 R |
| 6,856,221 | B1 * | 2/2005 | Zehrung | E05B 47/0002 335/220 |
| 8,418,954 | B2 * | 4/2013 | Allen | B64C 3/58 244/213 |
| 8,814,094 | B2 * | 8/2014 | Tran | B64C 25/26 244/100 R |
| 9,365,295 | B2 | 6/2016 | Sasscer et al. | |
| 9,511,876 | B2 | 12/2016 | Prokup et al. | |
| 9,837,197 | B2 * | 12/2017 | Irwin | H01F 7/088 |
| 2012/0297924 | A1 * | 11/2012 | Lang | F02C 7/32 74/99 R |
| 2013/0078026 | A1 * | 3/2013 | Sasscer | B64D 41/007 403/81 |
| 2013/0327207 | A1 | 12/2013 | Sasscer | |
| 2013/0327885 | A1 | 12/2013 | Sasscer | |
| 2013/0330121 | A1 | 12/2013 | Sasscer et al. | |
| 2014/0103277 | A1 * | 4/2014 | Cormack | B66F 7/065 254/89 R |
| 2016/0377154 | A1 | 12/2016 | Trybula | |
| 2017/0123448 | A1 | 5/2017 | Zajac | |
| 2017/0158344 | A1 | 6/2017 | Janisiow | |
| 2017/0204950 | A1 | 7/2017 | Sobolak | |
| 2017/0259933 | A1 | 9/2017 | Bortoli et al. | |
| 2017/0280877 | A1 * | 10/2017 | Bock | A47C 1/03 |

\* cited by examiner

RELEASE MECHANISM

FOREIGN PRIORITY

This application claims priority to European Patent Application No. 17461615.1 filed Sep. 28, 2017, the entire contents of which is incorporated herein by reference.

TECHNICAL FIELD

The present disclosure relates to release and locking mechanisms for deployable components. The mechanism is particularly suitable as an unlocking or release mechanism for a ram air turbine (RAT) actuator but could also find application in other deployable or movable systems such as other actuators, valves, pumps and the like.

BACKGROUND

Ram Air Turbines (RATs) are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power.

The RAT is typically pivoted into position by means of an actuator, for example a hydraulic actuator. The actuator typically includes a piston which extends to deploy the RAT. The actuator has a locking mechanism which prevents inadvertent movement of the piston and thus inadvertent deployment of the RAT.

The locking mechanism typically comprises a spring loaded locking piston which must be moved in an axial direction to release the actuator. Such a mechanism is disclosed for example in US 2013/0327207 A1.

A release mechanism is provided to permit this movement. Typically, the release mechanism comprises a toggle type linkage, one end of which is coupled to one end of the locking piston and the other end of which is axially fixed and rotatably coupled to a support.

A pair of linear solenoid actuators is coupled to the linkage and operable to move the linkage over centre between a locked and an unlocked position. The actuators are coupled to the linkage via an actuator rod which projects on both sides from the linkage. Two solenoids are provided for fail safe operation.

It is desirable to mount the actuating rod in such a manner that the actuating forces on both sides of the linkage so as to provide consistent operation of the mechanism.

SUMMARY

In accordance with an aspect of the invention, there is provided a toggle release mechanism comprising a platform, a toggle element and a solenoid. The toggle element comprises one or more rolling or sliding elements configured to move along a track between a first, locking position and a second, release position. The solenoid is configured to move the one or more rolling or sliding elements along the track between the first, locking position and the second, release position.

This provides a simplified release mechanism with fewer elements than conventional arrangements. The direct connection between the solenoid and the toggle element also improves reliability and quality of the mechanism.

The toggle release mechanism may further comprise one or more pivoting members rotatably mounted to the platform. The pivoting members may be connected to the toggle element such that the toggle element is attached to the platform via the pivoting members.

The one or more pivoting members may be connected to the toggle element in such a manner that permits relative rotation between the pivoting members and the toggle element whilst restricting the range of motion of the toggle element to that of the one or more pivoting members.

The one or more pivoting members may be connected to the toggle element via a clevis joint.

The one or more pivoting members may be connected to the toggle element at a position that is intermediate along its length. For example, the one or more pivoting members may be connected to the toggle element at a position that is 0.10 to 0.40 times the length of the toggle element, for example 0.20 to 0.30 times the length of the toggle element, and optionally about 0.25 times the length of the toggle element.

The one or more pivoting members may be connected to the toggle element at a position that is between a centrepoint of the toggle element and its connection to a locking member (e.g., the locking piston as described below). The toggle element may be connected to the locking member at a first end thereof (i.e., of the toggle element), via a first attachment mechanism. The toggle element may be connected to the solenoid at a second end thereof (i.e., of the toggle element), opposite to the first end, via a second attachment mechanism. The first attachment mechanism and/or the second attachment mechanism may comprise a clevis joint. The locking member may be movable (e.g., by the toggle release mechanism) to lock and release a component (e.g., a ram air turbine as described below) operatively connected to the toggle release mechanism.

The toggle element may be configured for attachment to a component at a first end thereof. The one or more rolling or sliding elements may be located at a second, opposite end of the toggle element.

The track may comprise a first portion configured to hold the one or more sliding elements in the first, locking position, and a second portion configured to hold the one or more sliding elements in the second, release position.

The first portion may comprise a detent for holding the one or more sliding elements in the first, locking position.

The one or more sliding elements may comprise one or more rollers.

The first portion may comprise a part-cylindrical surface having a curvature the same as that of the rollers.

The solenoid may comprise an arm movable along an axis and connected to the one or more rolling or sliding elements, such that movement of the arm along the axis causes the one or more rolling or sliding elements to move along the track between the first, locking position and the second, release position.

The solenoid may be configured such that energising the solenoid moves the arm along the axis from the first, locking position to the second, release position.

In accordance to an aspect of the invention, there is provided a ram air turbine actuation mechanism comprising a toggle release mechanism as described above.

In accordance to an aspect of the invention, there is provided a ram air turbine actuation mechanism comprising a spring biased locking piston movable between a first position in which the ram air turbine is held in a retracted position, and a second position which releases the ram air turbine, the ram air turbine actuation mechanism further comprising a toggle release mechanism as described above, the locking piston being coupled to the toggle member of the toggle release mechanism to apply a force thereto in a direction towards the platform of the toggle release mechanism.

The solenoid may further comprise a resilient member configured to bias the one or more rolling or sliding elements towards their locked position, such that when the solenoid is not energised the one or more rolling or sliding elements are retained in their locking position at least in part due to the biasing of the resilient member, and when the solenoid is energised the one or more rolling or sliding elements are moved from the first, locking position to the second, release position against the action of the spring.

BRIEF DESCRIPTION OF DRAWINGS

An embodiment of the disclosure will now be described by way of example only, with reference to the accompanying drawings in which.

DETAILED DESCRIPTION

Figure 1:
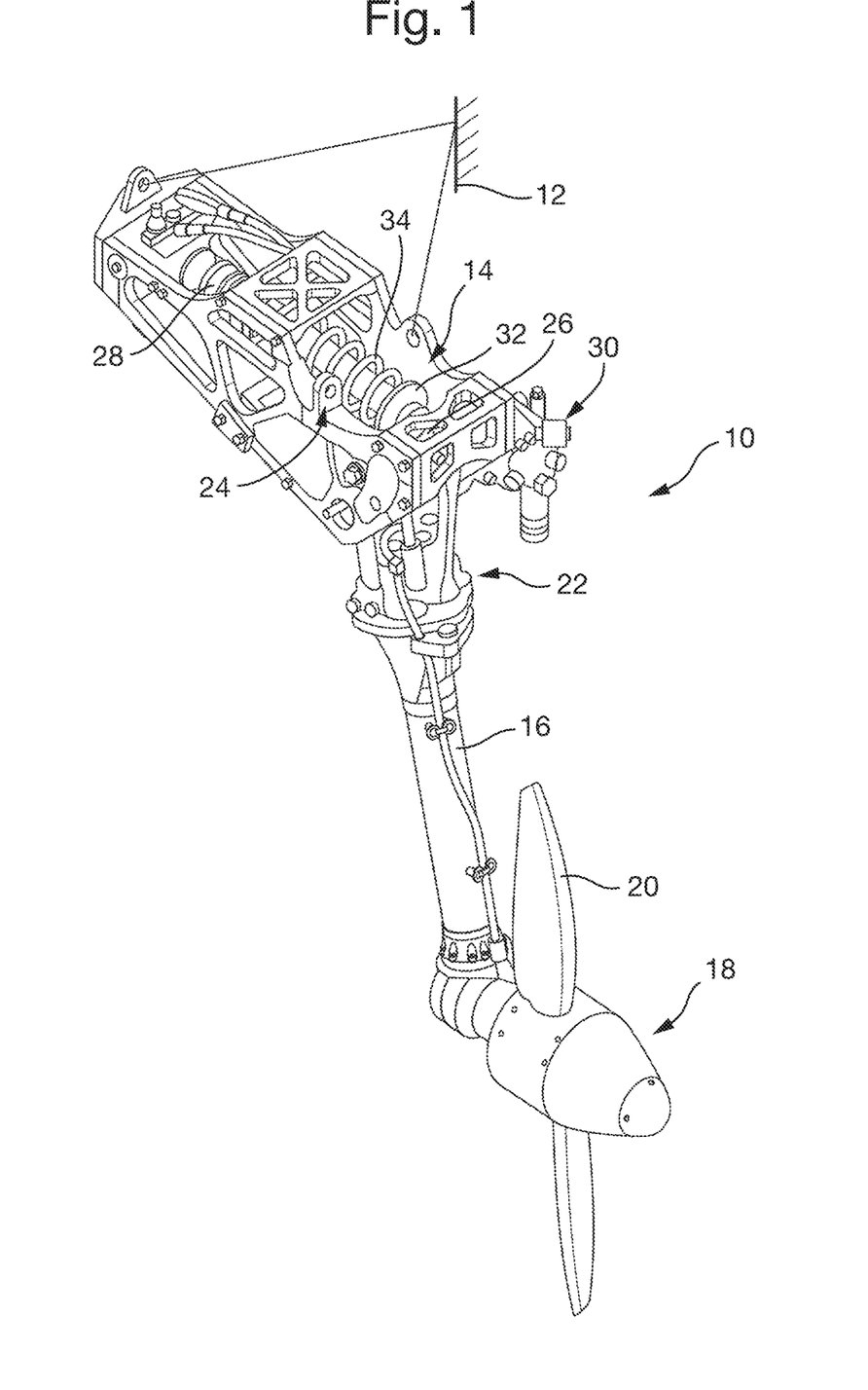
FIG. 1 shows a ram air turbine.

FIG. 1 illustrates an exemplary RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIG. 2.

Figure 2:
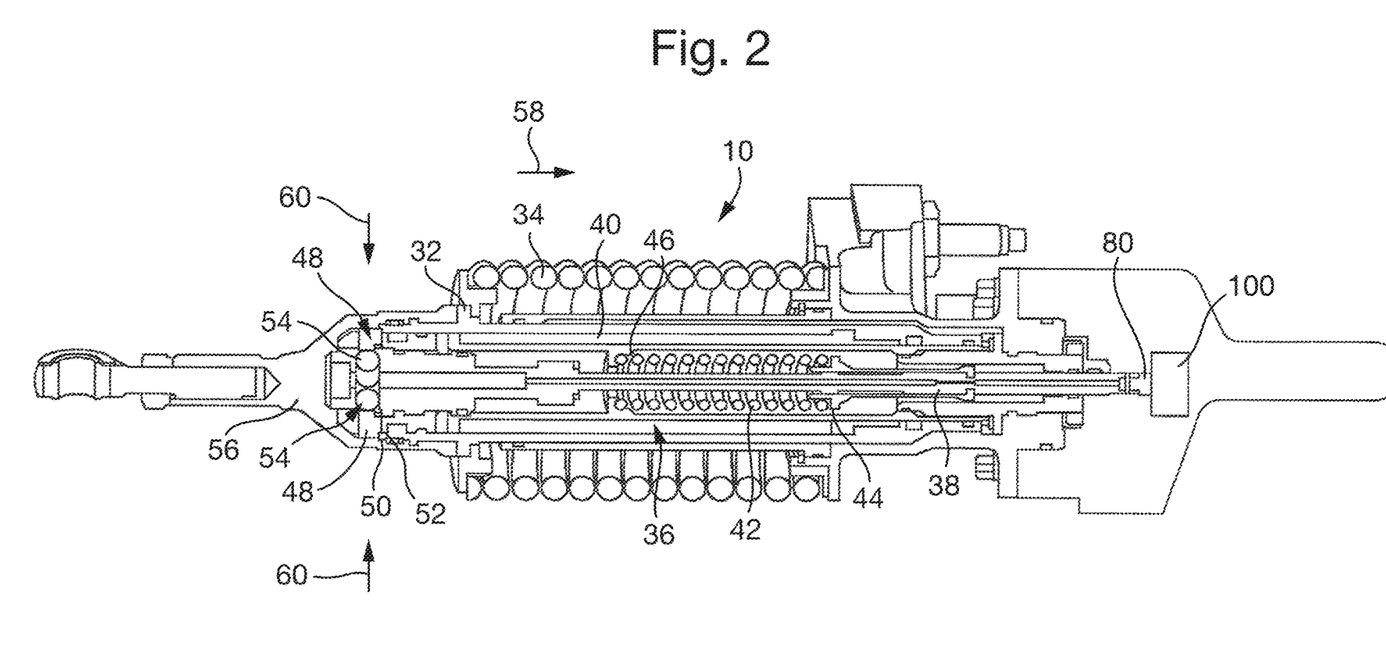
FIG. 2 shows some detail of the ram air turbine of FIG. 1.

With reference to FIG. 2, the locking mechanism 36 comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58 under the force of the biasing spring 42, the wedges 48 may displace in the direction of arrows 60 thereby disengaging the shoulders 50, 52 and allowing the cylinder 32 to extend to deploy the RAT. This general type of locking mechanism is known in the art and is discussed in some detail, for example in US 2013/0330121 A1 and US2013/0327885 A1.

To unlock the locking mechanism, the distal end 80 of the locking piston 38 is attached to a toggle release mechanism 100 illustrated only schematically in FIG. 2. In essence, as will be described further below, the release mechanism 100 is movable between a locking position in which it retains the locking piston 38 in the position shown in FIG. 2 and a release position in which it permits the locking piston 38 to move to the right under the force of the spring 42, move the rollers 54 of the locking piston 38 out of alignment with the locking surfaces of the locking wedges 48, thereby allowing deployment of the actuator cylinder 32.

A toggle release mechanism in accordance with an embodiment of the disclosure will now be described with reference to FIGS. 3 to 6.

As illustrated in FIGS. 3 to 6, the toggle release mechanism 100 may be coupled to the locking piston 38 of the ram air turbine discussed above however, it will be appreciated that the toggle release mechanism 100 may be used in many other applications.

Figure 3:
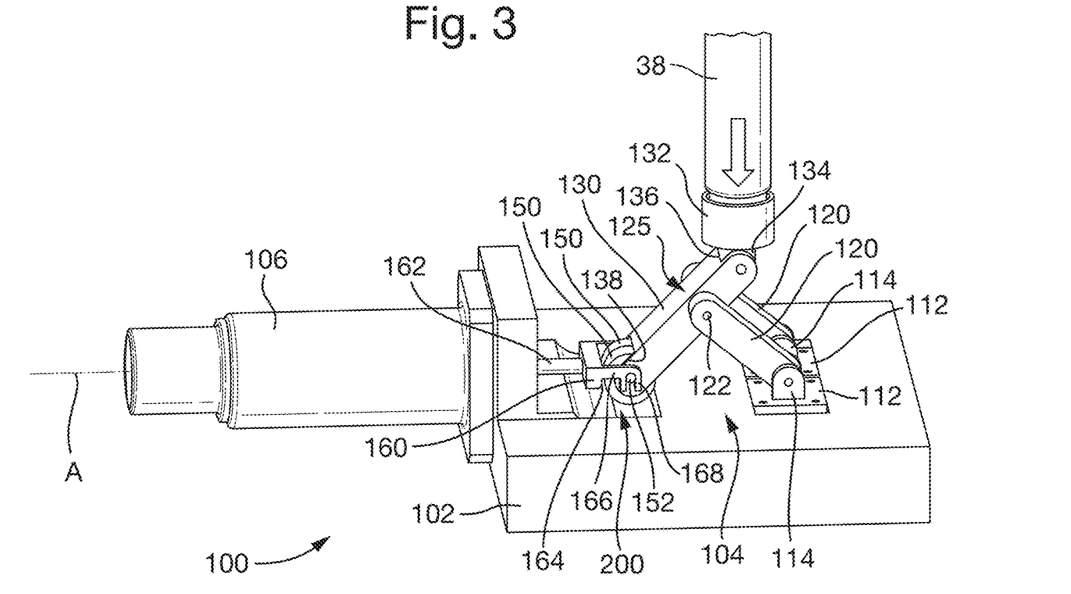
FIG. 3 shows, schematically, a perspective view of a toggle release mechanism and locking piston of a ram air turbine locking mechanism.

The toggle release mechanism 100 comprises a platform 102 (which may form part of a housing of the actuator 24, e.g., housing 14), a toggle element 130, and a solenoid 106.

One or more mounting elements 112 are attached to (or integral with) the platform 102, and each mounting element 112 comprises a clevis 114 for attachment to one or more pivoting members 120. The mounting elements 112 may be attached to the platform 102 by any suitable manner, for example using bolts or fasteners. The one or more pivoting members 120 may each be received (e.g., at a first end thereof) within a respective clevis 114 about which the pivoting members 120 rotate or pivot. A clevis pin (not shown) may be retained in each clevis 114, and may extend through an aperture in a respective pivoting member 120 to allow such rotation or pivoting.

A toggle element 130 may be connected to a connecting member 132 for attachment to, e.g., the locking piston 38. The locking piston 38 may be placed inside the connecting member 132, thereby coupling the two components together. The locking piston 38 and connecting member 132, although contacting each other, may not be physically attached to each other, e.g., by a fastening means such as a screw thread or bolt, since some relative movement may be desired between these components.

In the illustrated embodiment, the connecting member 132 comprises a projection 134 that is received within a first clevis 136 of the toggle element 130. A clevis pin (not shown) may be retained in the first clevis 136. This connection permits the toggle element 130 to rotate relative to the locking piston 38.

The pivoting members 120 may be connected (e.g., at a second, opposite end thereof) to the toggle element 130 at a point that is intermediate along the length of the toggle element 130. For example, and as shown in FIG. 3, the pivoting members 120 form a clevis 125 within which the toggle element 130 is received. A clevis pin may extend through apertures 122 in each of the pivoting members 120, as well as a corresponding aperture (not shown) in the toggle element 130. This connection means that the movement of the toggle element 130 is, in part, controlled by the range of motion of the pivoting members 120, whilst allowing the toggle element 130 to rotate relative to the pivoting members 120, as discussed in more detail below. Other means of connection are possible that permit such movement, and the broadest aspects of the present disclosure are not limited to the use of a clevis joint as illustrated in FIG. 3.

The toggle element 130 may comprise a second clevis 138 at an end thereof opposite to the first clevis 136. The second clevis 138 may receive one or more rollers 150 of the toggle element 130, which may be held by the toggle element 130 in such a manner that the rollers 150 can continuously rotate, but may not otherwise move relative to the toggle element 130. The rollers 150 may comprise pin elements 152 that act as a clevis pin for the second clevis 138, by extending through apertures in the toggle element 130. Alternatively, an axle may extend through the apertures in the toggle element 130 and the rollers 150, about which the rollers 150 rotate. Other arrangements are also possible.

The rollers 150 are configured to sit within a track 200 that is located on the surface of the platform 102, and further configured to move along the track in use, upon movement of the toggle element 130. In the illustrated embodiment, the track 200 is provided in the form of a cavity in the platform 102, although any suitable track 200 may be used (e.g., formed instead by protrusions, and/or using a track member attached to the platform 102).

The solenoid 106 may comprise an arm 160, which may comprise a first cylindrical and elongate portion 162, as well as an attachment portion 164 connected (e.g., integrally) to the first portion 162. The attachment portion 164 is configured to attach to the toggle element 130 such that movement of the toggle element 130 causes the arm 160 to move towards and away from the solenoid 106. In the illustrated embodiment, the attachment portion 164 is U-shaped, and comprises two arms 166 that extend around either side of the toggle element 130 for attachment thereto. The arms 166 may comprise slots 168, and the pin elements 152 of the rollers 150 (or other clevis pin of the second clevis 138) may slot into these slots 168 so as to cause movement of the arm 160 upon movement of the toggle element 130 as aforesaid. However, any suitable attachment may be provided between the arm 160 and the toggle element 130 that achieves such movement.

The solenoid 106 further comprises a spring 166 (or other resilient member) that is configured to bias the arm 162 in the direction of arrow 193 (see FIG. 4), e.g., via a piston 169 (see FIGS. 5A-6B), which forces the rollers 150 in the same direction, i.e., to the right as shown in the figures.

Figure 4:
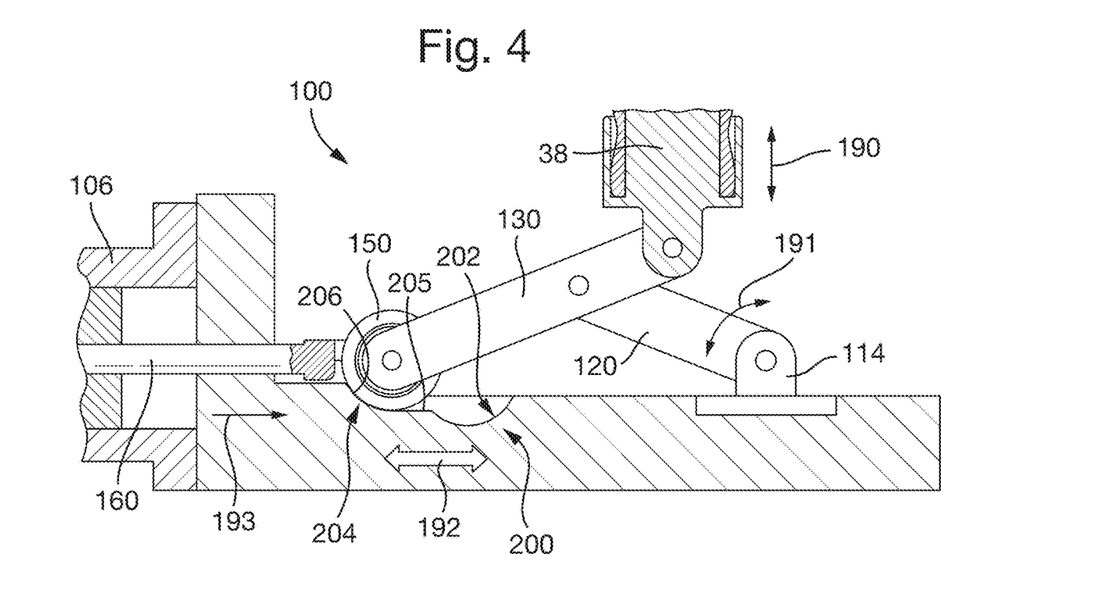
FIG. 4 shows a side view of the toggle release mechanism of FIG. 3 (in cross-section)

FIG. 4 shows a side view of the toggle release mechanism 100, which shows the track 200 in more detail, and wherein the rollers 150 have moved along the track from the position shown in FIG. 3 to the new position shown in FIG. 4.

The track 200 comprises a first portion 202 and a second portion 204, wherein the rollers 150 are configured to roll from the first portion 202, as shown in FIG. 3, to the second portion 204, as shown in FIG. 4. The first portion 202 may form a detent, such that the rollers 150 remain seated within the first portion 202 when the toggle release mechanism 100 is in the position shown in FIG. 3. In the illustrated embodiment, the first portion 202 is semi-cylindrical to provide this detent, wherein the curvature of the first portion 202 corresponds to that of the rollers 150.

The second portion 204 comprises a substantially flat portion 205 located adjacent to the first portion 202, and then a curved portion 206 located at an opposite end of the second portion 204. The rollers 150 and track 200 are configured such that the rollers 150 press against the curved portion 206 when the toggle release mechanism 100 is in the position shown in FIG. 4.

The toggle release mechanism 100 is configured such that movement of the locking piston 38 in the direction of arrow 190 pushes down on the toggle element 130, causing it to rotate relative to the locking piston 38 and with the aid of the pivoting members 120 (which rotate in the direction of arrow 191). This action causes the rollers 150 to move in the direction of arrow 192. This, in turn, causes the arm 160 of the solenoid 106 to move along its axis of movement (i.e., the longitudinal axis A of the solenoid 106, shown in FIG. 3).

Figure 5A:
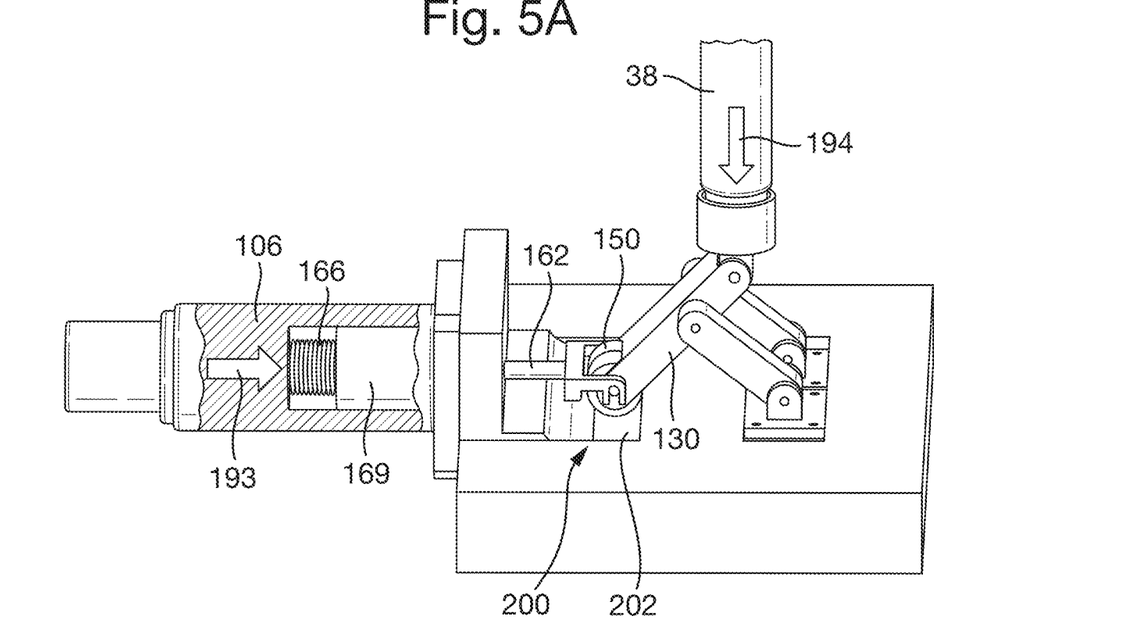
FIGS. 5A and 5B show the toggle release mechanism of FIG. 3 in a stowed position.
Figure 5B:
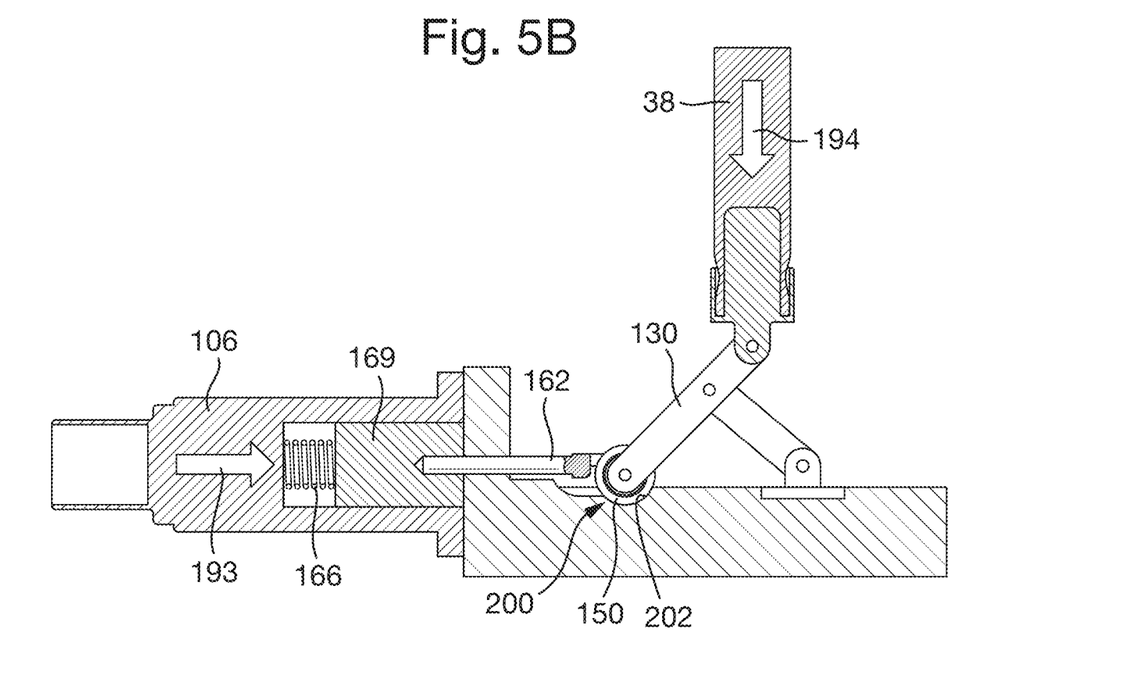
Figure 6A:
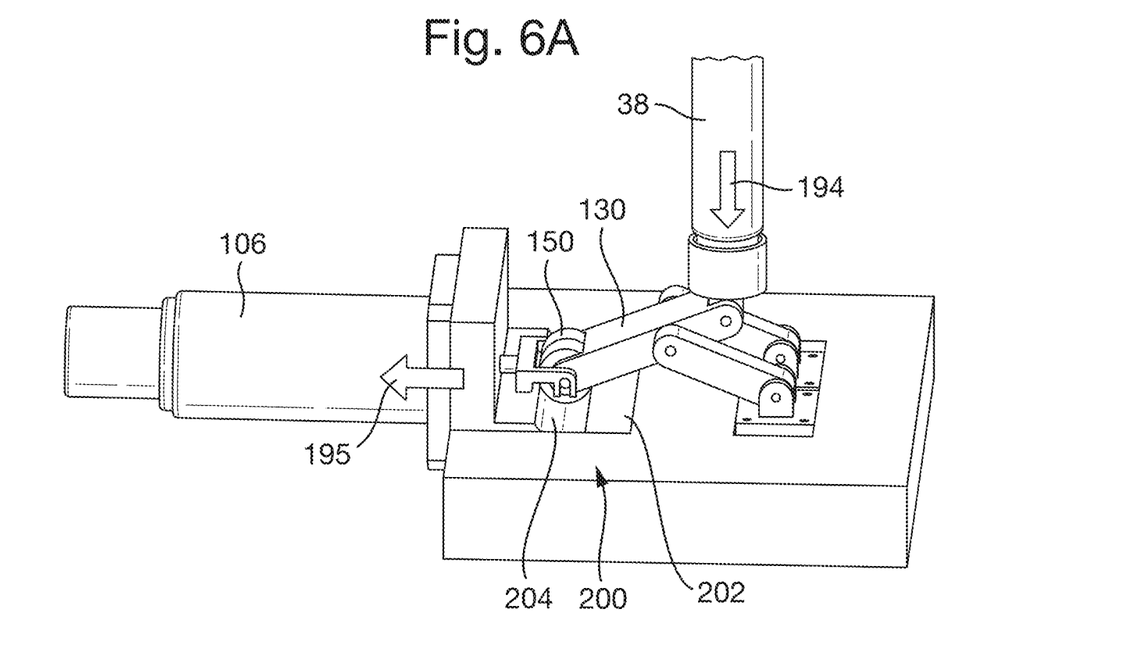
FIGS. 6A and 6B show the toggle release mechanism of FIG. 3 in a deployed position.
Figure 6B:
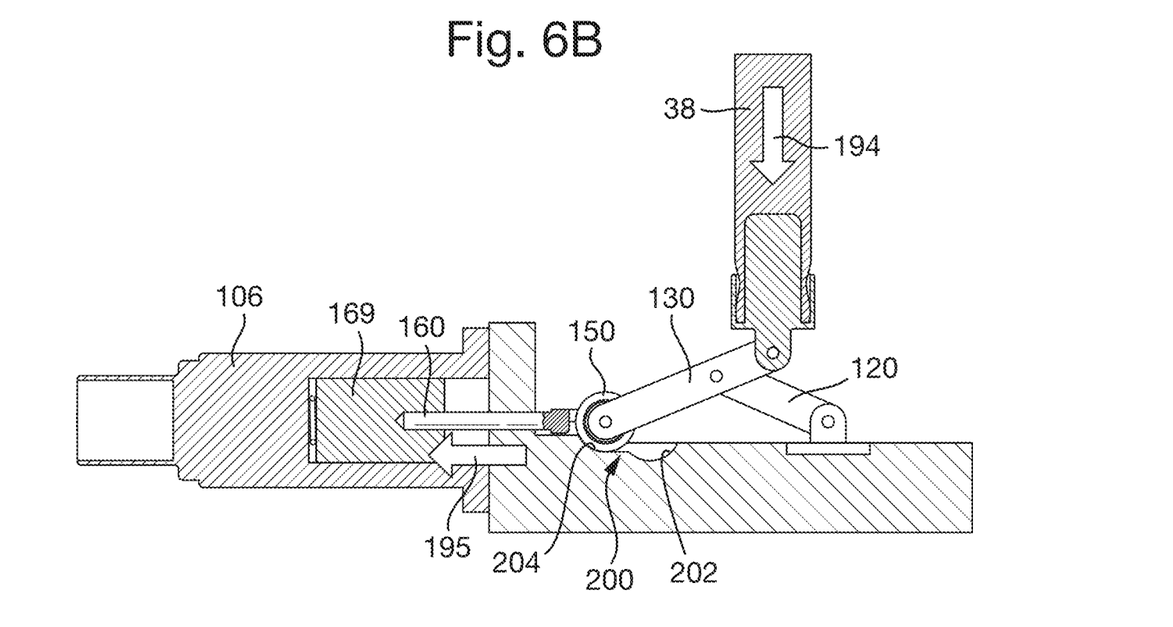

To describe the toggle release mechanism in more detail, we now provide a description of the mechanism between the position shown in FIG. 3, which may correspond to a locked or stowed position (see FIGS. 5A and 5B), to the position shown in FIG. 4, which may correspond to an unlocked, deployed or released position (see FIGS. 6A and 6B).

FIGS. 5A and 5B show the toggle release mechanism 100 in a locked or stowed position, corresponding, e.g., to the locking piston 38 of the ram air turbine described above being in a position in which axial movement of the cylinder 32 is prevented. In this position, the force of the spring 166 opposes the force of the locking piston 38, which is indicated by arrow 194 and acts (via the toggle element 130) to force the rollers in the opposite direction, i.e., to the left as shown in the figures. However, due to the force of the spring 166, and also to resistance provided by the rollers 150 being situated in the first portion 202 of the track 200, the locking piston 38 remains in its stowed position.

Referring now to FIGS. 6A and 6B, when it is desired to move the locking piston 38 into its unlocked, deployed or released position the solenoid 106 is energised, which pulls the arm 160 in the direction of arrow 195 (e.g., via piston 169). This causes the rollers 150 to move in the same direction, and ride up and out of the first portion 202 of track 200 and into the second portion 204 of track 200. Simultaneously, this action pulls the toggle element 130 to the left as shown in the figures, causing the pivoting members 120 to rotate, and the toggle element 130 to pull the locking piston 38 in the direction of arrow 194. In the example of the ram air turbine discussed above, this would cause the locking piston 38 to be in its release position in which deployment of the actuator cylinder 32 is permitted.

For the avoidance of doubt, it will be understood that terms such as "above" and "below", "up" and "down", or "left" and "right" as used herein are relative terms and do not imply any particular orientation of the mechanism in use.

It will also be understood that the above is a description of just one possible embodiment of the disclosure and that modifications may be made thereto without departing from the scope thereof.

The invention claimed is:

1. A ram air turbine actuation mechanism comprising:
   a spring biased locking piston movable between a first position in which the ram air turbine is held in a retracted position, and a second position which releases the ram air turbine; and
   a toggle release mechanism comprising:
      a platform;
      a toggle element comprising one or more rollers configured to move along a track between a first, locking position and a second, release position; and
      a solenoid configured to move the one or more rollers along the track between the first, locking position and the second, release position;
      wherein the track is located on the platform;
      wherein the track comprises a first portion configured to hold the one or more rollers in the first, locking position, and a second portion configured to hold the one or more rollers in the second, release position;

wherein the first portion of the track comprises a part-cylindrical surface having a curvature the same as that of the one or more rollers;

wherein said locking piston is coupled to the toggle element of the toggle release mechanism to apply a force thereto in a direction towards the platform of the toggle release mechanism;

wherein the solenoid further comprising a resilient member configured to bias the one or more rolling or sliding elements towards their locked position, such that when the solenoid is not energised the one or more rollers are retained in their locking position at least in part due to the biasing of the resilient member, and when the solenoid is energised the one or more rollers are moved from the first, locking position to the second, release position against the action of the spring.

2. A ram air turbine actuation mechanism as claimed in claim 1, further comprising one or more pivoting members rotatably mounted to the platform and connected to the toggle element such that the toggle element is attached to the platform via the pivoting members.

3. A ram air turbine actuation mechanism as claim in claim 2, wherein the one or more pivoting members are connected to the toggle element in such a manner that permits relative rotation between the pivoting members and the toggle element whilst restricting the range of motion of the toggle element to that of the one or more pivoting members.

4. A ram air turbine actuation mechanism as claim in claim 2, wherein the one or more pivoting members are connected to the toggle element via a clevis joint.

5. A ram air turbine actuation mechanism as claim in claim 2, wherein the one or more pivoting members are connected to the toggle element at a position that is intermediate along a length of the toggle element.

6. A ram air turbine actuation mechanism as claimed in claim 1, wherein the toggle element is configured for attachment to a component at a first end thereof, and the one or more rolling or sliding elements are located at a second, opposite end of the toggle element.

7. A ram air turbine actuation mechanism as claimed in claim 1, wherein the first portion comprises a detent for holding the one or more rolling or sliding elements in the first, locking position.

8. A ram air turbine actuation mechanism as claimed in claim 1, wherein the solenoid comprises an arm movable along an axis (A) and connected to the one or more rolling or sliding elements, such that movement of the arm along the axis (A) causes the one or more rolling or sliding elements to move along the track between the first, locking position and the second, release position.

9. A ram air turbine actuation mechanism as claimed in claim 8, wherein the solenoid is configured such that energising the solenoid moves the arm along the axis (A) from the first, locking position to the second, release position.

* * * * *